US012784548B2

(12) United States Patent
Matsuda

(10) Patent No.: US 12,784,548 B2
(45) **Date of Patent: *Nov. 3, 2026**

(54) GAMING MACHINE AND CONTROL METHOD FOR OPERATING GAMING MACHINES TO DISPLAY COMPUTER-ANIMATED REEL GAMES

(71) Applicant: Konami Gaming, Inc., Las Vegas, NV (US)

(72) Inventor: Masaya Matsuda, Zama (JP)

(73) Assignee: Konami Gaming, Inc., Las Vegas, NV (US)

( * ) Notice: Subject to any disclaimer, the term of this patent is extended or adjusted under 35 U.S.C. 154(b) by 712 days.

This patent is subject to a terminal disclaimer.

(21) Appl. No.: 17/338,007

(22) Filed: Jun. 3, 2021

(65) Prior Publication Data

US 2022/0114866 A1 Apr. 14, 2022

Related U.S. Application Data

(63) Continuation of application No. 15/705,777, filed on Sep. 15, 2017, now Pat. No. 11,055,968.

(51) Int. Cl.
*G07F 17/34* (2006.01)
*G07F 17/32* (2006.01)

(52) U.S. Cl.
CPC .......... *G07F 17/34* (2013.01); *G07F 17/3209* (2013.01); *G07F 17/3213* (2013.01);
(Continued)

(58) Field of Classification Search
CPC .. G07F 17/34; G07F 17/3209; G07F 17/3213; G07F 17/3225; G07F 17/3246; G07F 17/3267
See application file for complete search history.

(56) References Cited

U.S. PATENT DOCUMENTS 10,726,678 B1 * 7/2020 Rehill .................... G07F 17/326
2003/0050111 A1 * 3/2003 Saffari ................ G07F 17/3255
463/25

(Continued)

FOREIGN PATENT DOCUMENTS

AU 9471515 1/1995
JP 2001-293248 A2 10/2001

(Continued)

OTHER PUBLICATIONS

Aristrocrat: Return of the Samurai; 1997.
Aristocrat: Big Red; 2002.

*Primary Examiner* — Jeffrey K Wong
(74) *Attorney, Agent, or Firm* — Howard & Howard Attorneys PLLC

(57) ABSTRACT

A gaming machine provides an operation unit, a display unit, and a controller. The operation unit receives an operation of the player. The display unit displays a primary game and a feature. The controller establishes an outcome of the primary game and establishes a primary game award. The controller establishes a base feature award as a function of the primary game award, sets a feature trigger award equal to a multiple of the base feature award and provides the game feature to the player in response to detecting a trigger condition. The game feature includes a number of free plays. For each free play, the controller establishes an outcome of the free play, detects a second trigger condition and responsively awards the feature trigger award to the player and sets the feature trigger award to another multiple of the base feature award.

14 Claims, 14 Drawing Sheets

(52) U.S. Cl.
CPC ...... *G07F 17/3225* (2013.01); *G07F 17/3246* (2013.01); *G07F 17/3267* (2013.01)

(56) References Cited

U.S. PATENT DOCUMENTS

| | | | | | |
|---|---|---|---|---|---|
| 2003/0073482 | A1 | 4/2003 | Baerlocher et al. | | |
| 2003/0083123 | A1 | 5/2003 | Meyer | | |
| 2003/0222402 | A1 | 12/2003 | Olive | | |
| 2004/0166922 | A1* | 8/2004 | Michaelson | G07F 17/34 | 463/20 |
| 2005/0056995 | A1* | 3/2005 | Tempest | G07F 17/34 | 463/20 |
| 2005/0266909 | A1* | 12/2005 | Krynicky | G07F 17/32 | 463/13 |
| 2005/0277457 | A1* | 12/2005 | Wilson | G07F 17/3267 | 463/12 |
| 2006/0199634 | A1* | 9/2006 | Anderson | G07F 17/34 | 463/20 |
| 2007/0057464 | A1* | 3/2007 | Cockrell, Jr. | A63F 1/00 | 273/303 |
| 2007/0099695 | A1* | 5/2007 | Wilson | G07F 17/34 | 463/25 |
| 2008/0039190 | A1* | 2/2008 | Walker | G07F 17/32 | 463/25 |
| 2008/0113734 | A1* | 5/2008 | Watkins | G07F 17/34 | 463/19 |
| 2008/0146346 | A1* | 6/2008 | Hardy | G07F 17/329 | 463/16 |
| 2008/0242421 | A1* | 10/2008 | Geisner | A63F 13/75 | 463/42 |
| 2009/0239639 | A1 | 9/2009 | Yoshizawa | | |
| 2011/0034233 | A1 | 2/2011 | Berman et al. | | |
| 2014/0114890 | A1* | 4/2014 | Fujimaki | G06N 20/00 | 706/12 |
| 2014/0335935 | A1 | 11/2014 | Itagaki et al. | | |
| 2015/0111632 | A1 | 4/2015 | Meyer | | |
| 2015/0348374 | A1 | 12/2015 | Dupuis | | |
| 2016/0063799 | A1* | 3/2016 | Reeves | G07F 17/326 | 463/17 |

FOREIGN PATENT DOCUMENTS

| | | | |
|---|---|---|---|
| JP | 2008-68075 | A | 3/2008 |
| JP | 2008-100045 | A | 5/2008 |
| JP | 2009-213825 | A2 | 9/2009 |
| JP | 2015-73899 | A | 4/2015 |
| JP | 2015-526247 | A | 9/2015 |

* cited by examiner

| | | | | |
|---|---|---|---|---|
| PicB | Wild | PicB | PicD | J |
| Q | Wild | PicA | Q | PicA |
| K | Wild | J | A | 10 |
| Wild | Trigger | Q | PicB | 9 |
| Wild | 9 | PicD | PicD | J |
| Wild | J | Wild | Q | PicA |
| K | PicC | J | A | 10 |
| PicA | Trigger | Q | Wild | 9 |
| 9 | A | PicA | Wild | Wild |
| Trigger | PicA | K | Wild | Wild |
| J | Wild | Trigger | Trigger | Wild |
| PicC | Wild | PicC | PicA | PicC |
| Wild | Wild | A | PicC | Trigger |
| Wild | 10 | J | PicA | 10 |
| Wild | PicA | PicD | PicC | 9 |
| A | PicC | 9 | PicA | PicD |
| Q | Wild | J | J | 10 |
| PicD | 10 | Wild | Q | J |
| J | A | Wild | PicC | PicD |
| 10 | J | Wild | A | PicA |

FIG. 8
FIG. 9
RE-TRIGGER BONUS!
2X
4X
8X
16X
FREE GAMES WON!
1¢
9847
50
0
WIN
RE-TRIGGER BONUS!
2X
4X
8X
16X
TRIGGER WIN!
2000
PRESS SPIN BUTTON
1¢
9847
50
2000
WIN

GAMING MACHINE AND CONTROL METHOD FOR OPERATING GAMING MACHINES TO DISPLAY COMPUTER-ANIMATED REEL GAMES

CROSS REFERENCE TO RELATED APPLICATION

This application is a continuation of U.S. patent application Ser. No. 15/705,777, filed Sep. 15, 2017, the disclosure of which is hereby incorporated by reference in its entirety.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

SUMMARY OF INVENTION

In one aspect of the present invention, a gaming machine provides a game to a player. The gaming machine includes an operation unit, a display unit and a controller. The operation unit is configured to receive an operation of the player. The display unit is configured to display the primary game and the game feature. The controller is operably coupled to the operation unit and the display unit and is configured to:

- allow the player to establish a wager and to initiate the primary game, the controller in providing the primary game, being further configured to:
- establish an outcome of the primary game;
- establish a primary game award as a function of the outcome of the primary game and award the primary game award to the player; and,
- detect a first trigger condition and responsively (1) establish a base feature award as a function of the primary game award and set a feature trigger award equal to a multiple of the base feature award and (2) provide the game feature to the player, the game feature including a number of free plays. The controller, in providing each free play, being further configured to:
- establish an outcome of the free play; and,
- detect a second trigger condition and responsively (1) award the feature trigger award to the player and (2) set the feature trigger award to another multiple of the base feature award.

In another aspect of the present invention, a control method for providing a game to a player using a gaming machine is provided. The gaming machine includes an operation unit, a display unit, and a controller. The operation unit is configured to receive an operation of a player. The display unit is operably configured to display the primary game and the game feature. The controller is operably coupled to the operation unit and the display unit and allows the player to establish a wager and to initiate the primary game. The controller in providing the primary game, performs the steps of:

- establishing an outcome of the primary game;
- establishing a primary game award as a function of the outcome of the primary game and awarding the primary game award to the player; and,
- detecting a first trigger condition and responsively (1) establishing a base feature award as a function of the primary game award and set a feature trigger award equal to a multiple of the base feature award and (2) providing the game feature to the player, the game feature including a number of free plays. The method, in providing each free play, including the steps of:
- establishing an outcome of the free play; and,
- detecting a second trigger condition and responsively (1) awarding the feature trigger award to the player and (2) setting the feature trigger award to another multiple of the base feature award.

In still another aspect of the present invention, a program for a gaming machine provides a game to a player. The gaming machine includes an operation unit, a display unit, and a controller. The operation unit is configured to receive an operation of a player. The display unit is operably configured to display the primary game and the game feature. The controller is operably coupled to the operation unit and the display unit and allows the player to establish a wager and to initiate the primary game, the controller, in providing the game, performs the steps of:

- establishing an outcome of the primary game;
- establishing a primary game award as a function of the outcome of the primary game and awarding the primary game award to the player;
- detecting a first trigger condition and responsively (1) establishing a base feature award as a function of the primary game award and set a feature trigger award equal to a multiple of the base feature award and (2) providing the game feature to the player, the game feature including a number of free plays;
- the controller, in providing each free play, includes the steps of:
- establishing an outcome of the free play; and,
- detecting a second trigger condition and responsively (1) awarding the feature trigger award to the player and (2) setting the feature trigger award to another multiple of the base feature award.

DETAILED DESCRIPTION OF EMBODIMENTS

A gaming machine, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming machine, a control method for a gaming machine, and a program for a gaming machine that provides a game to a player. In one embodiment, the game may include a primary game and one or more feature(s) and/or bonus game(s). A primary game award may be awarded to the player as a function of the outcome of the primary game. In one aspect of the present invention, the bonus game may be triggered during the primary game. In general, when the bonus game is triggered a base feature award is established as a function of the primary game award. For example, the base feature award may be set equal to the primary game award. A feature trigger award is initially set equal to a multiple of the base feature award, e.g., 1×, 2×, or 4× the base feature award. The bonus game may include a number of free plays (see below). The bonus game may be re-triggered during the free plays. When the bonus game is re-triggered during a free play, the feature trigger award is awarded to the player. After the bonus game has been re-triggered and the feature trigger award has been awarded to the player, the feature trigger award is set equal to another multiple of the base feature award. For example, the feature trigger award may be doubled each time bonus game has been re-triggered during a free play and the free trigger awarded to the player. The player may also be awarded an award based on the outcome of each free play.

Figure 1A:
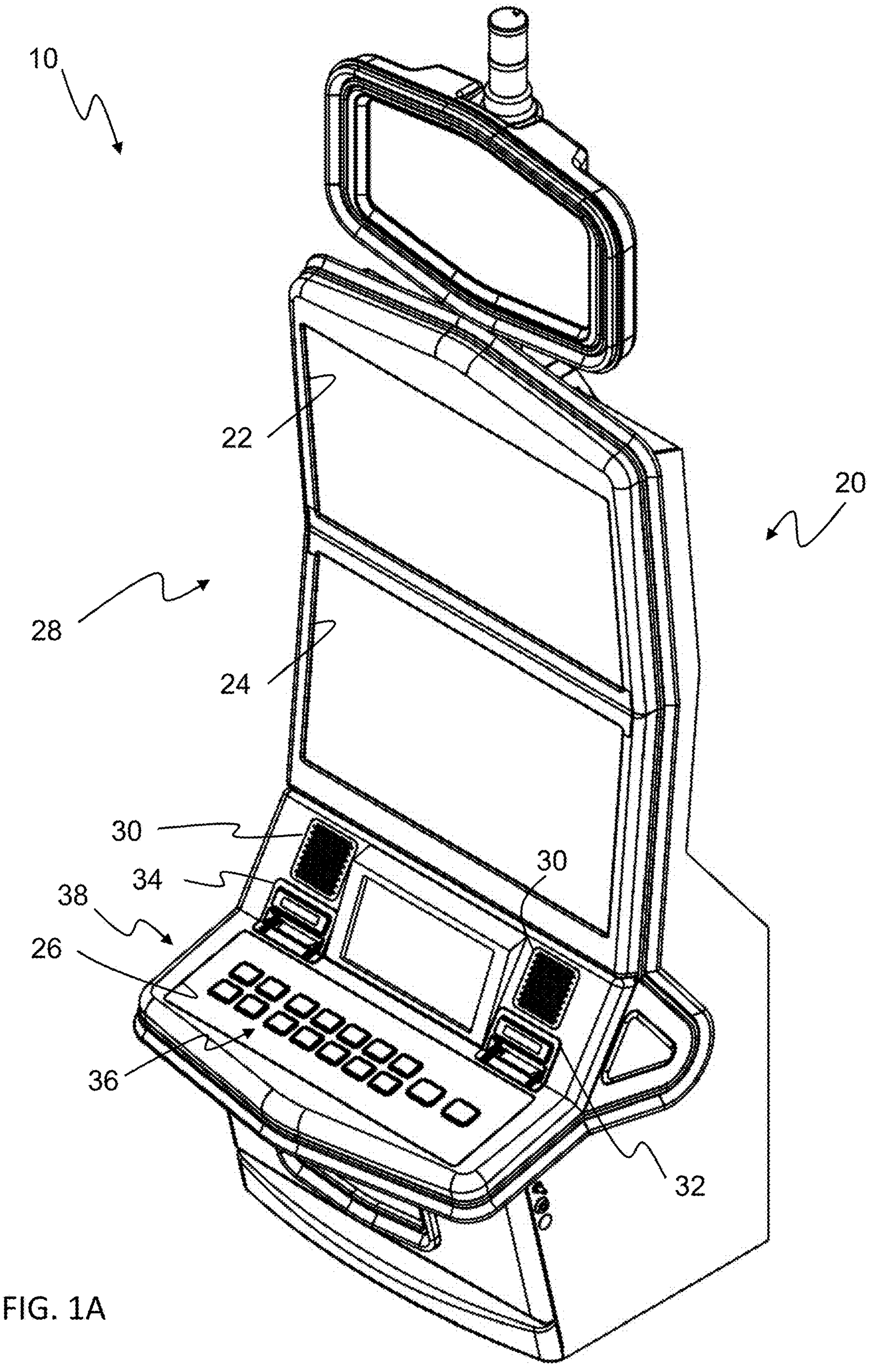
FIG. 1A is a perspective view of the gaming machine, according to the first embodiment.
Figure 1B:
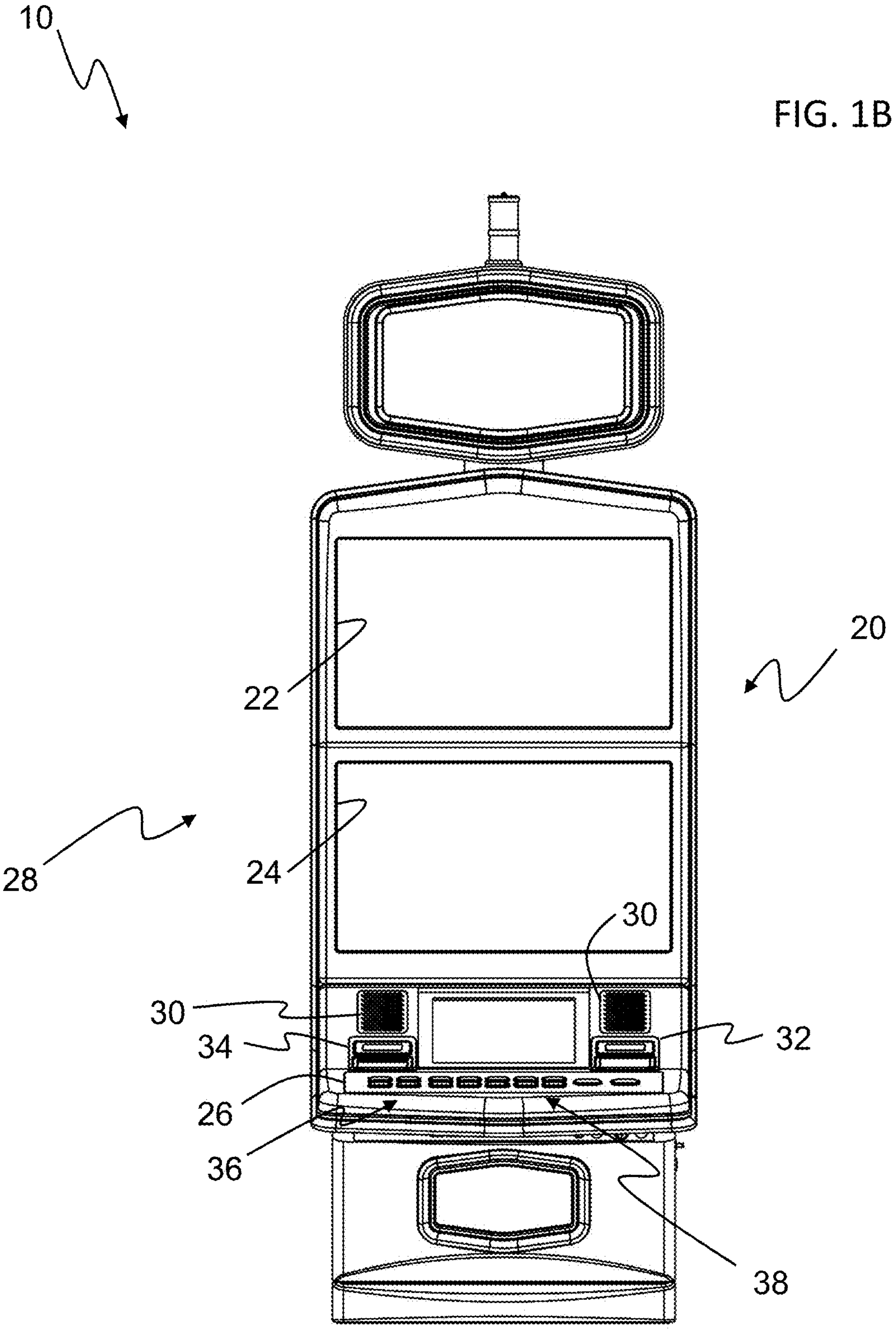
FIG. 1B is a front view of the gaming machine of FIG. 1A.

The gaming machine according to the present embodiment, receives a predetermined game value from the player, generates a game result, and provides a payout to the player according to the game result and one or more pay tables. FIG. 1A and FIG. 1B are a perspective view and a front view, respectively, of a gaming machine 10, according to the present embodiment. As shown in FIG. 1, this gaming machine 10 provides a cabinet 20 providing an upper display 22, a lower display 24, a control panel 26 and may also house a player tracking or ranking unit 57 (see FIG. 2). The cabinet 20 also houses a controller 50 (see FIG. 2) that controls each part (see below). The controller 50 also implements a random number generator (RNG) that is used during operation of the game. Each configuration is described below.

The upper display 22 and the lower display 24 may be flat panel display devices, such as both liquid crystal display devices and organic EL display devices and the like, and by controlling via each controller 50, the display area mentioned below functions as a display unit 28 provided to the player.

Speakers 30 are provided on the left and right of the cabinet 20, and by controlling via the controller 50, sound is provided to the player. On the control panel 26, a bill/ticket identification unit 32, the printer unit 34, and an operation unit 36 are provided.

The player tracking unit 57 may be housed on the center of the front surface of the cabinet 20 below the lower display 24. The player tracking unit 57 has a card reader that recognizes a player identification card, a display that presents data to the player, and a keypad that receives input by the player. This type of player tracking unit 57 reads information recorded on the player identification card inserted by the player into the card reader, and displays the information and/or information acquired by communicating with the external system on the display, by cooperatively operating with the controller 50 mentioned below or an external system. Further, input from the player is received by the keypad, the display is changed according to the input, and communication with the external system is carried out as necessary.

The bill/ticket identification unit 32 is disposed on the control panel 26 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification unit 32, receives and identifies bills/tickets (including vouchers and coupons) that are the game value as a game executing value, and notifies the controller 50 mentioned below.

The printer unit 34 is disposed on the control panel 26 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer unit 34, under the control of the controller 50 mentioned below, prints information on paper and outputs a ticket according to credit payout processing from the gaming machine 10. The output ticket can use the payout credit as game play by being inserted into the bill/ticket identification unit 32 of another gaming machine, or, can be exchanged for cash by a kiosk terminal inside of the casino or a casino cage.

The operation unit 36 receives the operation of the player. The operation unit 36 includes a group of buttons 38 that receives various instructions from the player on the gaming machine 10. The operation unit 36, for example, may include a spin button and a group of setting buttons. The spin button receives an instruction to start (start rotating the reel) the game listed below. The group of buttons 38 includes a group of bet buttons, a group of line-designation buttons, a max bet button, and a payout button and the like. The group of bet buttons receives an instruction operation regarding the bet amount of credits (bet number) from the player. The group of line-designation buttons receive an instruction operation that designate a pay line (referred to as an effective line below) subjected to a line judgment below from the player. The max bet button receives an instruction operation regarding the bet of the maximum amount of credits that can be bet at one time from the player. The payout button receives an instruction operation instructing a credit payout accumulated in the gaming machine 10.

Figure 2:
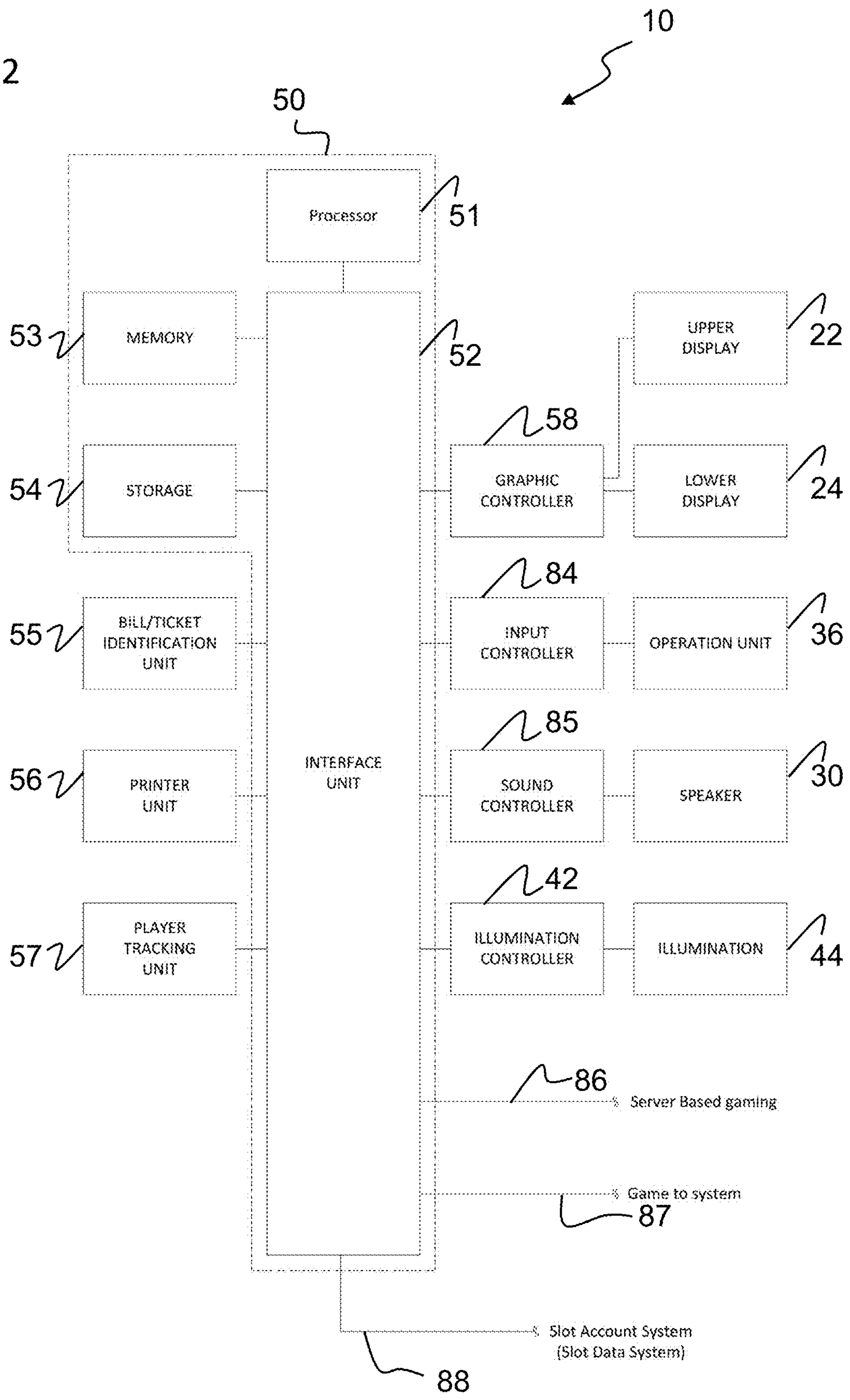
FIG. 2 is a functional block diagram of the gaming machine in FIG. 1.

With reference to FIG. 2, further on the inside of cabinet 20, a control board equipped with a central processing unit 51 (abbreviated as CPU below) that configures the controller 50, an interface unit (or part) 52, a memory 53 and a storage 54 and the like are incorporated. The control board is configured so that communication is possible through the interface unit 52 and each of the components equipped on the cabinet 20, controls the operation of each part by executing the program recorded in the memory 53 or the storage 54 of the CPU 51, and provides a game to the player.

FIG. 2 shows a functional block diagram of the gaming machine 10, according to the present embodiment. The gaming machine 10 provides the controller 50. The controller 50 is configured as the interface unit 52 including a chip set providing communication functions of the CPU 51, a memory bus connected to a CPU 51, various expanding buses, serial interfaces, USB interfaces, Ethernet (registered trademark) interfaces and the like, and a computer unit where the CPU 51 provides the addressable memory 53 and the storage 54 through the interface unit 52. The memory 53 can be configured to include RAM that is a volatile storage medium, ROM that is a nonvolatile storage medium, and EEPROM that is a rewritable nonvolatile storage medium. The storage 54 provides the controller 50 as an external storage device function, can use reading devices such as a memory card that is a removable storage medium, and a magneto optical disk and the like, and can use hard disks.

On the interface unit 52, in addition to the CPU 51, the memory 53, and the storage 54, a bill/ticket identification unit 55, a printer unit 56, the player tracking unit 57, a graphic controller 58, an input controller 84, and a sound controller 85 are connected. That is, the controller 50 is connected to the operation unit 36 through the input controller 84, and connected to the upper display 22 and/or the lower display 24 through the graphic controller 58. Further, when illumination 44 that provides decorative lighting to the gaming machine 10 is provided, the illumination 44 is controlled under the control of the controller 50 on the interface unit 52, and an illumination controller 42 that provides a decorative lighting effect may be connected.

The controller 50, which includes memory 53 and storage 54, controls each part by executing a program stored in the memory 53 and the storage 54, and provides a game to the player. Here, for example, the memory 53 and storage 54 may be configured to store a program and data of an operating system and subsystem that provide the basic functions of the controller 50 to the EEPROM of the memory 53, and stores a program and data of an application that provides a game to the storage 54. According to such a configuration, it can be easy to change or update a game by replacing the storage 54. Further, the controller 50 may be a multiprocessor configuration that has a plurality of CPUs.

Each block connected to the controller 50 is described below. The bill/ticket identification unit 55 corresponds to the bill/ticket identification unit 32, receives bills/tickets in the insertion opening, and notifies the controller 50 of identifying information corresponding to the assortment of bills or the payout processing of credits. The bill/ticket identification unit 55 notifies the information to the controller 50, and the controller 50 increases the usable credit amount inside of the game according to the notified content.

The printer unit 56 corresponds to the printer unit 34, and under the control of the controller 50 that receives an operation of the payout button of the group of buttons 38, information corresponding to the credit payout processing from the gaming machine 10 is printed and output on a printed ticket.

The player ranking (or tracking unit) unit 57 cooperatively operates with the controller 50, and sends and receives information and the like of the player from the casino management system. The graphic controller 58 controls the upper display 22 and the lower display 24, under the control of the controller 50, and displays a display image that includes various graphic data. The sound controller 85 drives the speakers 30 under the control of the controller 50, and provides various sounds such as an announcement, sound effects, BGM and the like.

Further, the interface unit 52, has various communication interfaces for communicating with the exterior of the gaming machine 10, for example the interface unit 52 can communicate with an external network by Ethernet 86, 87, and a serial interface 88. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Figure 3:
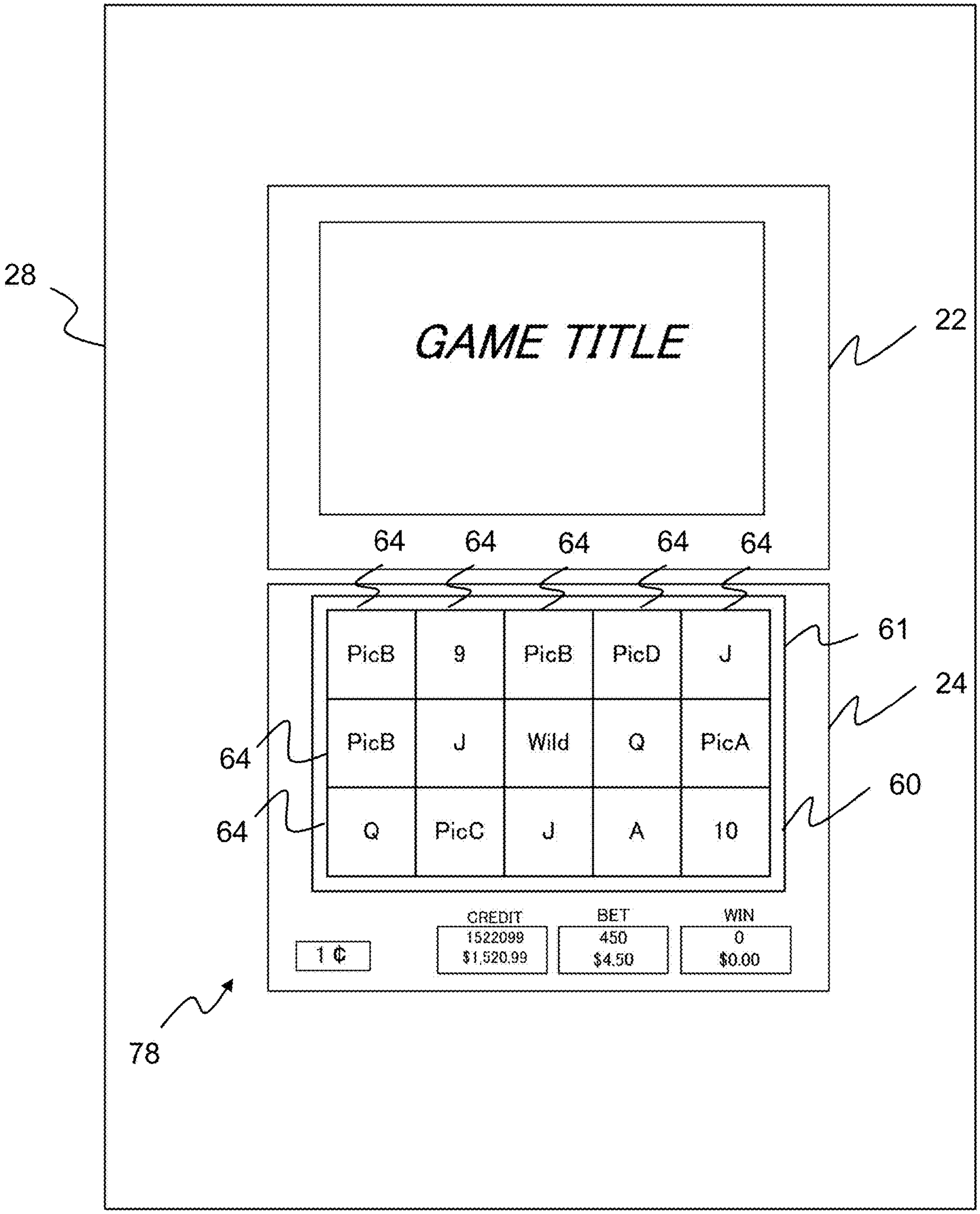
FIG. 3 is a first diagrammatic illustration of a display area of the gaming machine in FIG. 1, according to an embodiment of the present invention.

FIG. 3 schematically shows a display area 78 provided by the gaming machine 10. Such a display area 78 is displayed on the display unit 28 (the upper display 22 and/or the lower display 24) by the controller 50 executing a predetermined program. In the illustrated embodiment, the display area 78 is displayed on the lower display 24. For instance, as shown, during the primary game and/or the bonus game, the upper display 22 may be utilized to display game related information, e.g., game title information and/or graphics.

In one aspect of the present invention, the gaming machine 10 provides a game to the player. The game may include a primary game and a game feature. The game feature may include one or more of (1) a multiplier applied to an award or payline, (2) a number of free games or spins, and/or (3) a bonus game. For instance, the primary game may be a video slot game, and the game feature may be the awarding of a number of free games or spins in response to the occurrence of a trigger condition, e.g., during the primary game. During the free spins, the game feature may also be provided.

Returning to FIG. 3, the game of the present invention utilizes a grid 60 in the display area 78 during the primary game and the free spins (if provided). The illustrated embodiment shows the state of displaying the display area 78 in the lower display 24. As shown in FIG. 3, the display area 78 includes the grid 60 for displaying symbols. By using such a display area 78, the gaming machine 10 of the present embodiment may operate as a slot machine that pays a payout according to a winning combination of symbols displayed on the display area 78.

The display unit 28 displays a plurality of symbols in the grid 60. In one embodiment the grid 60 may have a plurality of rows (r) and columns (c). The grid 60 is configured by a plurality of cells 64 that are the stop position of symbols.

With reference to FIG. 3, the grid 60 may be displayed on the lower display 24. The upper display 22 may be used to display animations and/or game identifying information during the primary game and/or during an attract mode. Further, the display unit 28 can display a decorative area, and an area that displays credit amount, bet number, and a credit amount obtained by winning (WIN number) and the like, outside of the grid 60. On each of the plurality of cells 64 of the display area 78, one symbol is stopped and displayed.

Figure 4:
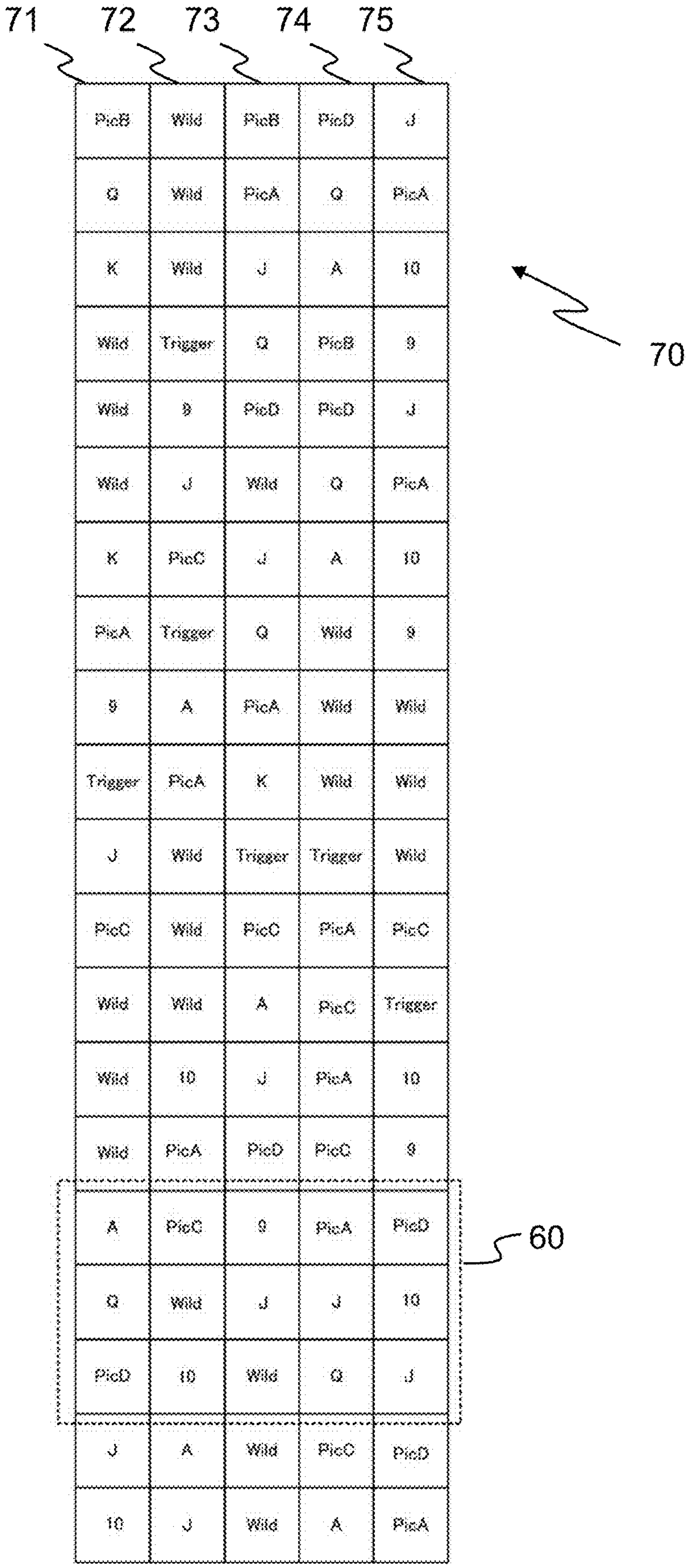
FIG. 4 is a figure showing an exemplary symbol arrangement showing the order of symbols displayed on the display area, according to an embodiment of the present invention.

In one embodiment, on each cell 64 of the grid 60, as shown in FIGS. 3 and 4, a symbol is displayed based on the symbol arrangement of virtual reel strips 71 to 75 configured of a virtual reel set 70. That is, the cells 64 of the grid 60 correspond to the virtual reel strips 71 to 75 by column, and the symbols disposed on predetermined parts of each virtual reel strip 71 to 75 are displayed. Furthermore, by moving (scrolling or spinning) each symbol by column based on the symbol arrangement of the virtual reel strips 71 to 75, the symbols displayed in the cells 64 of the grid 60 change, and by stopping the movement (scrolling or spinning) by columns, the symbols are stopped. Here, the virtual reel strips 71 to 75 are data where the controller 50 uses a program having the memory 53 or the storage 54, and data showing the symbol arrangement (i.e., the order of symbols on each reel) regulated by each cell column. Further, the virtual reel set 70 is a general term for such virtual reel strips 71 to 75.

Figure 5:
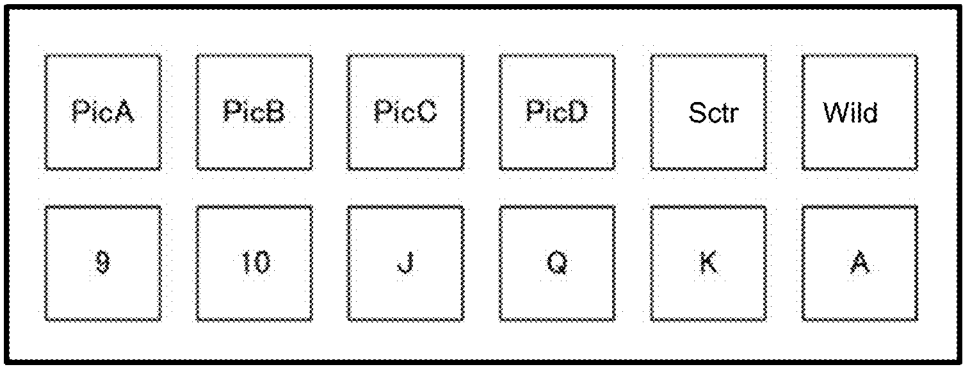
FIG. 5 is a figure showing the symbols displayed on the display area, according to an embodiment of the present invention.

Each virtual reel strip 71 to 75, in the examples of FIG. 4, may be configured by 20 symbols in respective symbol positions, and those symbols are aligned in an order defined by each reel. FIG. 5 is the details of symbols of the figure shown in FIG. 4. Each virtual reel strip 71 to 75 includes symbols selected from a symbol set of 13 varieties shown in FIG. 5. This symbol set includes card symbols ("9", "10", "J", "Q", "K", and "A") that imitate playing cards as regular symbols, and picture symbols ("PicA", "PicB", "PicC", and "PicD") that show a pattern. Further, this symbol set includes a wild symbol ("Wild") that is substituted as another symbol when a win combination is determined and a Scatter symbol ("Sctr") that is used to determine if a game feature is to be provided (see below). Each of these symbols may a different rank from each other regarding their value when winning, their rank gradually raises in this order: "9", "10", "J", "Q", "K", "A", "PicD", "PicC", "PicB", "PicA". A combination of symbols that includes high-ranking symbols when winning, can obtain a larger winning payout compared to a combination of low-ranking symbols when winning.

It should be noted that in the illustrated embodiment, each column of the grid 60 has a corresponding reel strip. When the reel strip stops, a symbol from the respective reel strip appears in each one of the cells of the respective column of the grid 60. In an alternative embodiment, however, each cell 64 of the grid 60 has a respective independent reel that may spin independently of the other reels. Each cell 64 of the grid 60 may, thus, have an independent reel with a corresponding virtual reel strip 71 to 75.

It should be noted that the primary game and the bonus game, i.e., the free plays, may be other types of games other than a slot or video slot games. For example, the primary game and/or the bonus game may be a poker game, bingo, keno or other type of game.

In the next several embodiments, the present invention will be described with respect to a 3×5 grid, however, it should be noted that the present invention is not limited to a grid with any specific size and/or shape. Furthermore, the below discussion describes a game having a primary game and a bonus game. The bonus game provides a plurality of free games and/or spins.

In general, the controller 50 starts a game (either the primary game or a free spin in the bonus game), determines the stop position of each virtual reel strip 71 to 75 randomly, the virtual reel strips 71 to 75 move from a current position, and the operation to stop on a stop position uses the display unit 28 (for example, the lower display 24) and is expressed. Due to this, in the display or grid 60, the symbols included on the virtual reel strips 71 to 75 are continuously moved (scrolled or spun) in the vertical direction of the display area 78, and one symbol of one cell 64 aligned in an order of the symbol based on the symbol arrangement is stopped so that it is displayed.

The controller 50 changes and stops the plurality of symbols displayed on the display unit 28 according to the operation of the player received by the operation unit 36, and a payout may be paid according to the stopped symbols inside the display area 78.

In the display area 78, a pay line is set that is used when winning is determined. The pay line is set to be extended over the column on the right end from the cells 64 of the column of the left end, and is a line that combines the plurality of cells 64 determining a win. The number of effective lines within the set pay line is selected by the operation of a group of line designation buttons included in the group of buttons 38 of the operation unit 36 for the player. The controller 50, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 78 is set (see FIG. 6). The system for determining a win may determine a win when a predetermined number of identical symbols from cells of the column on the left end are aligned on a set pay line, may determine a win when a predetermined number of identical symbols from cells 64 of the column on the right end are aligned on a set payline, and may determine a win when a predetermined number of identical symbols are aligned on a continuous column on a predetermined payline. In addition, more than a predetermined number of the "Sctr" form a win combination or trigger condition regardless of the pay line.

Figure 6:
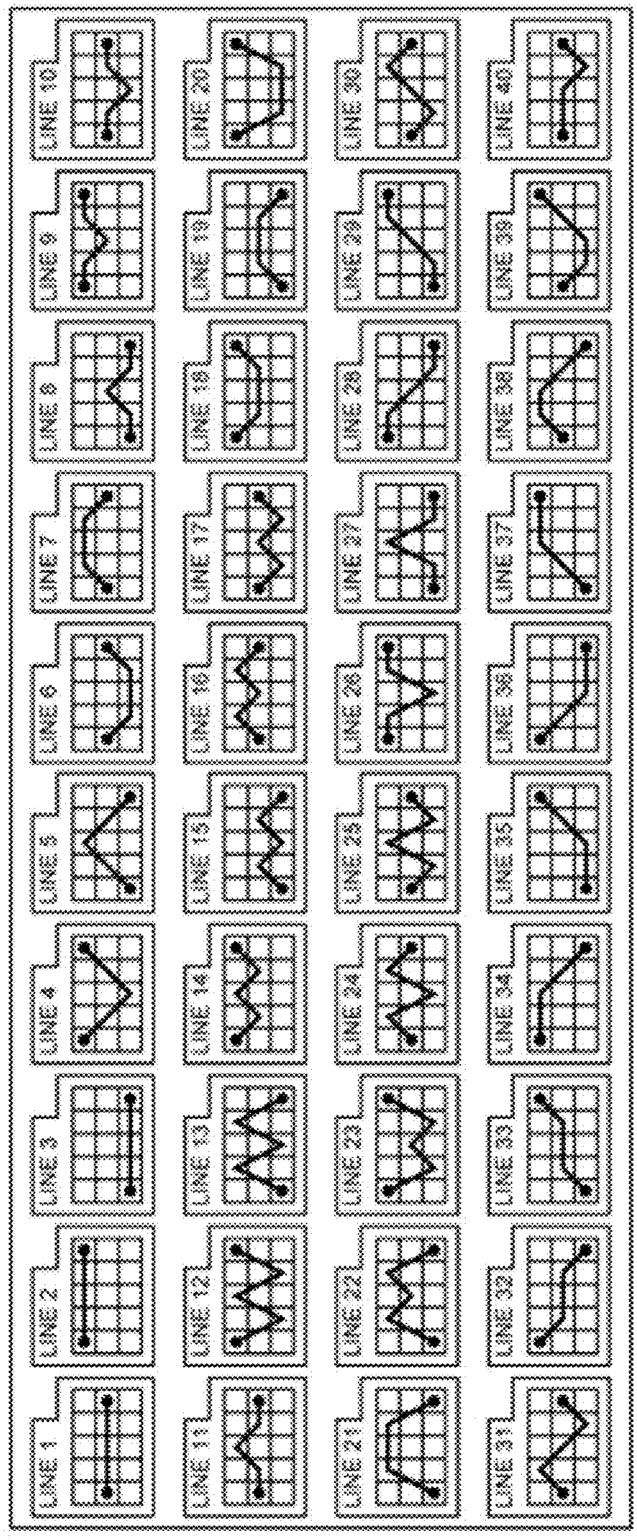
FIG. 6 is a figure showing one example of a pay line set on the determination area in FIG. 3.

It should be noted that pay lines shown other than (or in addition to) the pay lines shown in FIG. 6 may be used. In general, the paylines shown in FIG. 6 start in the first column and end in the last column, and include one cell 64 per column. However, one or more paylines could include one or more cells 64 in the same column and may include a vertical payline.

Returning to FIGS. 1A-4, in one embodiment the gaming machine 10 includes an operation unit 36, a display unit 28 and a controller 50. The operation unit 36 is configured to receive an operation of a player. The display unit 38 is configured to display a display area 78. The display area 78 includes a plurality of cells 64 arranged in a grid 60 and configured to display a respective symbol in each cell 64. The symbol displayed in each cell 64 is from a set of symbols. The symbols in the set of symbols have a ranking from lowest to highest.

The controller 50 is operably coupled to the operation unit 36 and the display unit 38 and is configured to allow a player to establish a wager and to provide a game in response to player operation. In one embodiment, the game or primary game is a video slot game. The controller 50 selects a plurality of symbols to display in the cells 64 of the grid 60 utilizing simulated reel strips 71-75 in a manner to simulate rotating reels. The plurality of symbols is displayed in the cells 64 of the grid 60 when the simulated rotating reels are stopped.

In one embodiment, the grid 60 may have a plurality of columns. Each column defines a reel of the video slot game and has an associated reel strip 71-75. In another embodiment of the present invention, each cell 64 of the grid 60 has an associated reel strip.

The gaming machine 10 of the present embodiment provides a primary game (also referred to as a main game) and a game feature. The game feature may include the awarding to the player of one or more of free games or free spins. Generally, the game feature is provided when predetermined conditions, i.e., a triggering condition, are satisfied. Concerning a primary game (and any frees spins), the symbols displayed in the display area 78 configure a combination of symbols that are the result of a game, and determine a win.

It should be noted that game feature may also be provided during any free game or free spin (see below). For example, if the game feature includes one or more free games or spins, the player may be awarded additional free games or spins, during a free game or spin.

In one embodiment, the game feature is triggered when a predetermined number of a predetermined one of the symbols appears in a primary or free game outcome. For example, the game feature may be triggered when three Wild symbols appear in the primary game outcome, and in response, eight free spins are awarded to the player. During the free spins, the appearance of two or three Wild symbols appearing in the outcome of a free spin results in the awarding of an additional three and eight, respectively, free spins. Alternatively, the triggering condition may be a mystery trigger, i.e., independent upon an outcome of the game.

In one embodiment, the virtual reel strips utilized in the free spins may be different or the same as the virtual reel strips used in the primary game. Additionally, the player may be awarded an award based on the outcome of each spin, whether a spin in the primary game or a free spin, a set of paylines and a predetermined paytable. The paylines and/or paytable used in the free spins may be the same and/or different than the paylines and/or paytable used in the primary games.

The controller 50 is operably coupled to the operation unit 36 and the display unit 28 and is configured to allow the player to establish a wager and to initiate the primary game. In providing the primary game, the controller 50 establishes an outcome of the primary game. If the outcome of the primary game is a winning outcome, a primary game award is established and awarded to the player. If, for example, the primary game is a video slot machine, the outcome of the primary game includes a plurality of symbols being displayed in the grid 60. One or more winning conditions may be defined by a paytable and one or more played paylines (see above). In one embodiment, the primary game award may be determined as a function of the outcome of the primary game, the player's wagers, the paytable, and/or paylines. The outcome of the primary game may establish one or more winning conditions and the primary game award may be defined as the aggregate of the award associated with each of the winning conditions.

Additionally, if a first trigger condition exists, the controller 50 will trigger the game feature. In the illustrated embodiment, the game feature includes the awarding to the player of one or more free games, e.g., free spins which are provided by the controller 50.

If the game feature is triggered establishes a base feature award as a function of the primary game award and sets a feature trigger award equal to a multiple of the base feature award.

In one embodiment, the first trigger condition may be a winning condition in the primary game outcome. In another embodiment, the first trigger condition may be the existence of a winning condition in the primary game outcome and the appearance of one or more of a predetermined symbol, e.g., the Wild symbol or the Scatter symbol, in the outcome.

In still another embodiment, the first trigger condition may be the appearance of one or more of a predetermined symbol, e.g., the Wild symbol or the Scatter symbol, in the outcome, even if a winning condition has not occurred. In this embodiment, the base feature award may be established as a function of a previous primary game award.

The outcome of each free game may include one or more winning outcomes. For example, if the free games are free spins of a virtual slot game, the player may be awarded an awarded based on the outcome of the free spin, player paylines and a respective payline. In addition, as discussed above, the game feature may be re-triggered in each free game or spin (whether or not the outcome includes a winning outcome based on a payline). As will be explained in further detail below, if the game feature is re-triggered during a free spin, additional free spins will be awarded to the player and the feature trigger award will be automatically awarded to the player.

The controller 50 in providing each free play, is configured to establish an outcome of the free play. As discussed above, the outcome may include one or more winning conditions. In one embodiment, if a winning condition exists, the player may be awarded an award based on the winning condition and a paytable.

For each free play or spin, a second trigger condition may occur. If the controller 50 detects a second trigger condition, the feature trigger award is automatically awarded to the player and the feature trigger award is set equal to another multiple of the base feature award.

If during the primary game, a player is awarded a primary game award of J number of credits and the game feature is triggered, the base feature award established as a function of the primary game award. The (initial) feature trigger award is set equal to a multiple (J) of the base feature award. In one embodiment, the base feature award is set equal to the primary game award and J is equal to 1, so the (initial) feature trigger award is equal to the primary base award.

In one embodiment, each time the game feature is re-triggered during a free game or free spin, the feature trigger award is set equal to (another) multiple of the base feature award. For example, the feature trigger award may be doubled each time the game feature is re-triggered during the free games or spins until a maximum is reached. A sample is shown in the table below:

| Re-Trigger | Feature Award Awarded | After Re-Trigger, Feature Award = |
|---|---|---|
| $1^{st}$ | 1 × base feature award | 2 × base feature award |
| $2^{nd}$ | 2 × base feature award | 4 × base feature award |
| $3^{rd}$ | 4 × base feature award | 8 × base feature award |
| $4^{th}$ | 8 × base feature award | 16 × base feature award |
| $5^{th}$ and above | 16 × base feature award | 16 × base feature award |

In one embodiment, the controller 50, is further configured to award the player an additional number of free plays in response to the second trigger condition being detected during a free play or spin.

In one embodiment, the first and/or second triggering conditions may be functions of the outcome of the primary game or the free play, respectively. For example, the first and/or second triggering conditions may be defined as the appearance of a predetermined number of a predetermined one of the symbols appears in a primary or free game outcome. For example, the game feature may be triggered when three Wild symbols appear in the primary game outcome, and in response, eight free spins are awarded to the player. During the free spins, the appearance of two or three Wild symbols appearing in the outcome of a free spin results in the awarding of an additional three and eight, respectively, free spins. Alternatively, the triggering condition may be a mystery trigger, i.e., independent upon an outcome of the game.

As discussed above, when the game feature is triggered a base feature award may be set equal to the primary game award. The feature trigger award is initially set equally to a multiple of the base feature award. For example, in one embodiment, the feature trigger award may be initially set to 1× the base feature award. Each time the game feature is re-triggered during a free game or spin, the feature trigger award is awarded to the player and the feature trigger award is re-set to another multiple of the base feature award. For example, in one embodiment the feature trigger award may be doubled each time the game feature is re-triggered (up to a maximum).

As discussed above, in one embodiment, the primary game and the free games are video slot games. The free games or spins may utilize different virtual reel strips.

Figure 7A:
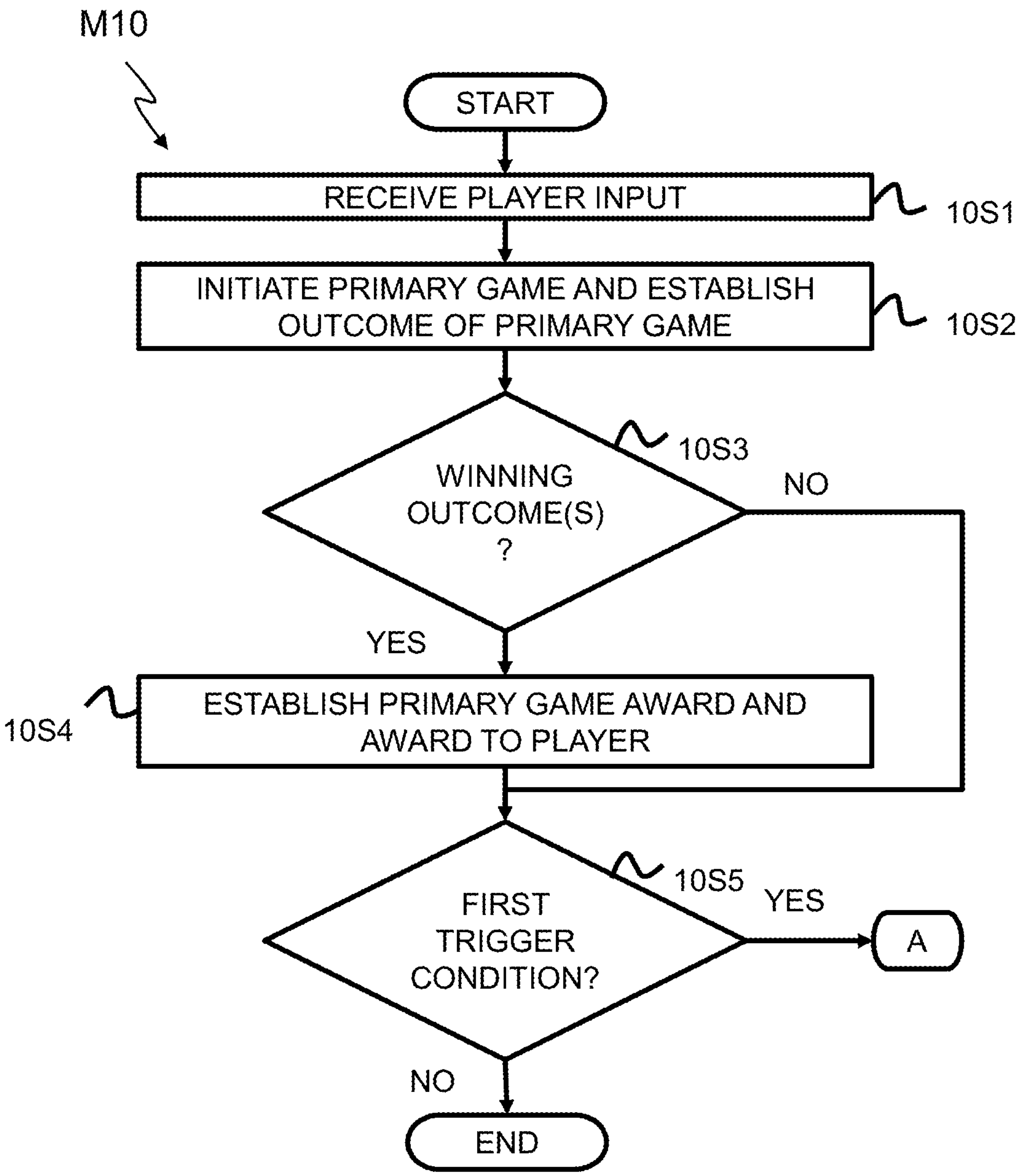
FIGS. 7A-7B is a flow chart describing the operation of the gaming machine during a game, according to one embodiment of the present invention.
Figure 7B:
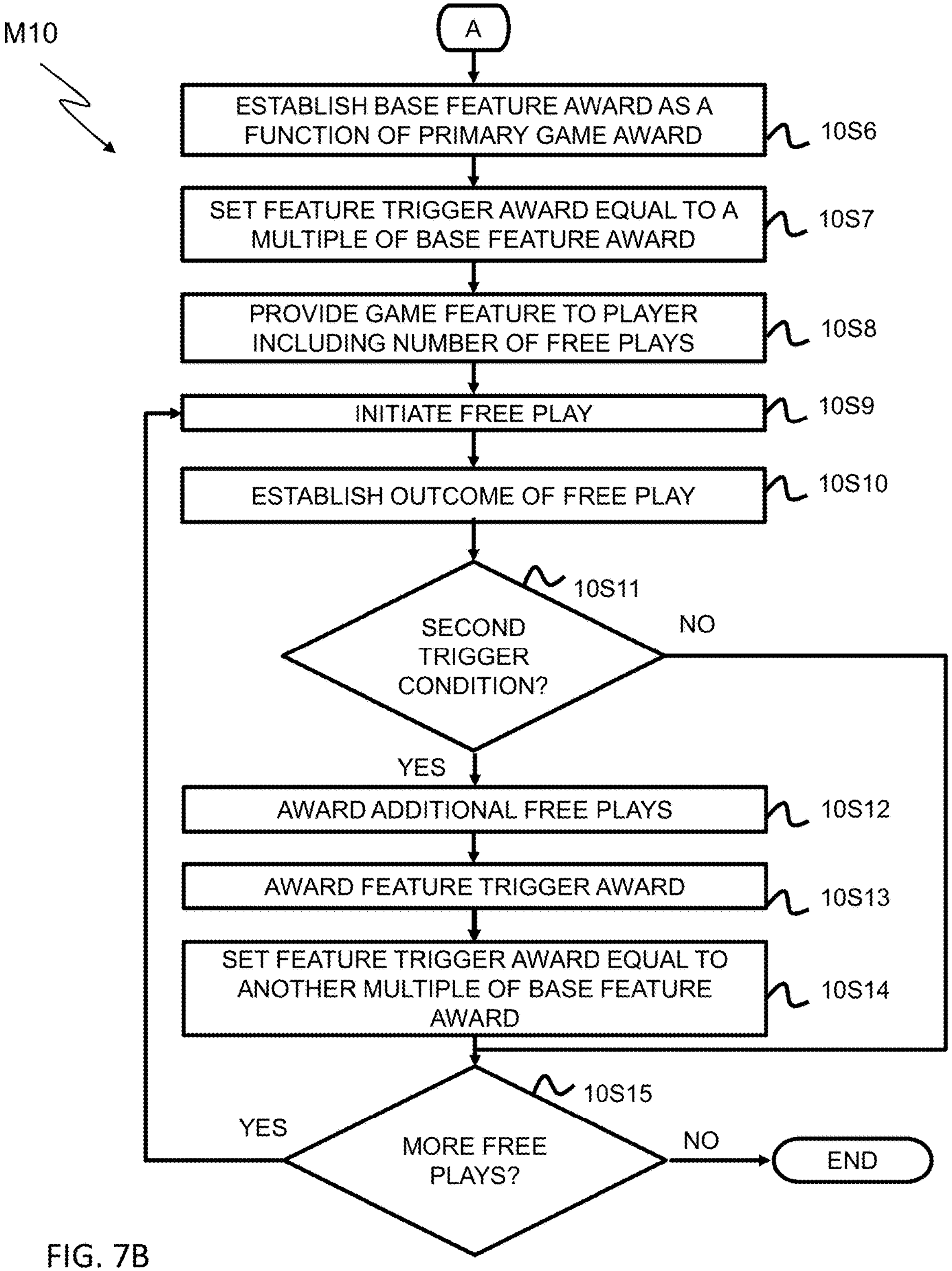
Figure 8:
FIGS. 8-13 are diagrammatic illustrations of the display area of the gaming machine in FIG. 1, according to an embodiment of the present invention.

With reference to FIG. 7, a method M10 provides a game to a player using a gaming machine 10. The gaming machine 10 may include an operation unit 36, a display unit 28 and a controller 50. The operation unit 36 may be configured to receive an operation of a player. The display unit 28 may be operably configured to display the primary game and the game feature. The controller 50 may be operably coupled to the operation unit 36 and the display unit 28 to allow the player to establish a wager and to initiate the primary game.

In a first step 1051, player input (or operation) is received from the player. In a second step 10S2, the primary game is initiated and an outcome of the primary game is established.

In a third step 10S3, if there are any winning outcomes, then the method M10 proceeds to a fourth step 10S4. Otherwise, the method M10 proceeds to a fifth step 1055. In the fourth step 10S4, a primary game award is established as a function of the outcome of the primary game and awarded to the player.

In the fifth step 1055, if the first triggering condition is detecting than the game feature is initialized and a number of free games or spins are awarded to the player. If the first trigger condition is not detected, then the primary game ends.

In a sixth step 1056, a base feature award is established as a function of the primary game award. In one embodiment, the base feature award is set equal to the primary game award. In a seventh step 1057, the (initial) feature trigger award is set equal to a multiple of the base feature award. In one embodiment the feature trigger award is set equal to 1× the base feature award.

In an eighth step 1058, a number of free plays are awarded to the player. In a ninth step 1059, a free play or spin is initiated and the outcome of the free play is established in the tenth step 10510. The player maybe awarded an award based on any winning outcomes in the free play outcome.

In an eleventh step 10511, if the second trigger condition has been detected then the method M10 proceeds to a twelfth step 10512. Otherwise, the method M10 proceeds to a fifteenth step 10S15.

In the twelfth step 10512, additional free plays are awarded to the player. In a thirteenth step 10S13, the feature trigger award is automatically awarded to the player. In a fourteenth step 10S14, the feature trigger award is set equal to another multiple of the base feature award. In one embodiment the feature trigger award is doubled each time the game feature is re-triggered in the free plays, up until a maximum.

In the fifteenth step 10S15, if there are any remaining free spins, the method M10 returns to the ninth step 10S9. Otherwise, the method M10 ends.

In one embodiment of the present invention, the gaming machine 10 includes the operation unit 36, a display unit 22, 24 and a controller 50. The operation unit 36 is configured to receive an operation of a player (see above). The display unit 22, 24 is operably coupled to the operation unit 36 and is configured to display a symbol display area 78. The symbol display area 78 includes a plurality of cells 64 arranged in a grid 60. As discussed above, the grid 60 has a plurality of rows and a plurality of columns.

The controller 50 is operably coupled to the operation unit 36 and the display unit 22, 24 and is configured to initiate a game in response to player operation and to establish an outcome of the game. The controller 50, in response to initiation of the game, being randomly selects a plurality of symbols associated with the symbol display area 78 or grid 60. Each symbol in the plurality of symbols is associated with one of the plurality of cells 64 in the grid 60. The plurality of symbols forms the outcome of the primary game.

In some embodiments, each symbol in the outcome of the primary game may be randomly selected. In the illustrated embodiment, the game is a video slot game. As discussed above, each column has an associated reel strip. In randomly selecting the symbols, the controller 50 randomly determines a stop position (using a random number generator or RNG) for each reel strip and displays the outcome in a manner to simulate rotating reels. The symbol in each column in the outcome is a function of the associated reel strip and the randomly determined stop position.

With reference to FIGS. 8-13, several views of the display area 78 are shown at the end of a primary game and during the game feature. With specific reference to FIG. 8, the primary game has just ended. The player has been awarded a total award of 2000 credits (from one or more winning conditions in the primary game outcome). In addition, the game feature award has been triggered by the appearance of three trigger (Wild) symbols in the primary game outcome.

Figure 9:

With specific reference to FIG. 9, prior to the initiation of the free spins, the total amount won (2000 credits) is shown in the bottom right of the display area. In the illustrated embodiment the base feature award is set equal to the amount won in the primary game (2000 credits). In the illustrated embodiment, the initial feature trigger award is set equal to the base feature award. The player is notified: "Trigger Win! 2000". The bonus or game feature is re-triggered by the appearance of 2 or 3 Wild symbols appearing in the outcome of any of the free spins. If the bonus or game feature is re-triggered during the game feature, the player is awarded an additional 3 or 8 free spins, respectively.

Figure 10:
Figure 11:

With reference to FIG. 10, the successive re-triggering feature trigger awards (2000, 4000, 8000, 16000 and 32000 credits) are displayed along the top of the display area 78. The appearance of two Wild symbols in an outcome of the free spin results in (1) the awarding of the current feature trigger award (2000 credits) and (2) the awarding of additional (three) spins, as shown. The feature trigger award is doubled to 4000 credits which is then highlighted on the display area 78, as shown in FIG. 11.

Figure 12:
Figure 13:

In a subsequent free spin, two Wild symbols in an outcome of the free spin re-trigger the game feature, as shown in FIG. 12. Three additional free games are award and the current feature trigger award (4000) is automatically awarded to the player. Then, the feature trigger award is doubled again to 8000, which is highlight on the display area 78 (see FIG. 13).

In another aspect of the present invention, a free game or bonus game feature may be provided. In one embodiment, the free game or bonus game feature is triggered during the main game. The controller 50 determines if a trigger condition has occurred during the primary game. If the trigger condition has occurred, then the bonus game feature is provided. In one embodiment, the trigger condition is defined as the appearance on a predetermined number of one of a predetermined one of the symbols in a feature area 61 of the grid.

In one embodiment, the controller 50 is configured to detect an occurrence of a predetermined symbol in the outcome of the primary game and to responsively provide a game feature as a function of the occurrence of the predetermined symbol in the outcome of the main game. The bonus game feature may include a number of free games (or spins). The predetermined symbol may be the scatter symbol. The number of free games may be predetermined, randomly determined and/or determined as a function of the number of occurrences of the scatter symbol in the feature area. For example, in one embodiment five, eight, twelve or twenty free spins are provided upon the occurrence of three, four, five and six scatter symbols, respectively.

In one aspect of the present invention, the reel strips used in the free game feature are different than the reel strips 71-75 used in the main game.

Next, is a description of a program of the gaming machine 10 for operating one or a plurality of computers as the controller 50. The gaming machine 10 stores the program in the memory 53, and can execute the program. The gaming machine 10 can access the program stored in the memory 53 and can operate as the gaming machine 10 of the present embodiment by the program.

Further, the program according to the embodiment may be provided through a network or stored in a recording medium. Recording media such as a floppy (registered trademark) disk, CD-ROM, DVD, or ROM and the like, or semiconductor memory and the like are exemplified as a recording medium. In this case, a program stored in the memory uses a reading device inside the gaming machine 10 such as a floppy (registered trademark) disk drive device, CD-ROM drive device, and DVD drive device and the like.

The embodiments of the present invention are described above, but the present invention is not limited to such an embodiment, a variety of variations are possible.

In such an embodiment, a gaming machine 10 providing a game in the form of a slot machine is described, but this is not limited thereto, and a game in the state of poker, a video card game called black jack, bingo, keno, a wheel game and the like may be provided. Further, it is possible to apply the present invention to a pachinko machine or a pachinko slot machine.

In one embodiment, referring to FIGS. 1A and 1B, the control panel 26 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 28 and/or the player tracking unit 57, the paper money/ticket identification unit 42, the operation unit 36, the player tracking unit 57, a coin slot, a ticket in ticket out (TITO) system, a bill acceptor, and/or any suitable device that enables the gaming machine 10 to receive media associated with a monetary value and establish a credit balance for use in playing the gaming machine 10. In one embodiment, the acceptor device may be configured to receive physical media such as, for example, a coin, a medal, a ticket, a card, a boll, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein. For example, in one embodiment, the coin slot may include an opening that is configured to receive coins and/or tokens deposited by the player into the gaming machine 10. The controller 50 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

In the embodiment, determining the stop position of each reel is described as consecutively acquiring a random number that is used respectively, but the acquisition procedure of the random number is not limited to this. For example, when the game starts, the controller 50 acquires these random numbers in a batch, and each random number may be stored in the storage area of the non-erasing memory 53 or the storage 54 when power failure occurs. In this type of situation, even when a power failure and the like occurs during a game, because the controller 50 acquired the random number from the memory 53 or the storage 54 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above when the game starts all of the random numbers are acquired in a batch, and by saving these random numbers in the memory 53 or the storage 54, such great dissatisfaction can be avoided for the player because the progress of a game similar to before a power failure occurred can be reproduced after recovering from a power failure.

In another embodiment, the player may initiate a game through actuation of a spin button (or other button). After initiation of the game, the controller 50 randomly determines the step position of all reels. The controller 50 may perform the check for the trigger condition before the reels stop spinning, and thus has already determined the outcome of the game. However, the controller 50 displays the outcome of the game in a step by step process as discussed above. Further, if the trigger condition has occurred with respect to the columns in the left plurality of columns, the check and evaluation of the outcome with respect to the columns in the right plurality of columns should be performed in certain embodiments. For example, if the bonus game is provided that is triggered based on the outcome, the outcome must be established to perform such an evaluation.

Further, in the embodiment, a bill/ticket is displayed as game value, and received by these bill/ticket identification devices (32, 55), and a form where a ticket is output by a printer unit 34 is described, but the present invention is not limited to this. The game value is a concept including tangible objects such as a coin, bill, coin, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

As discussed above, the controller 50 may include the processor 51 and a random-number generator (RNG) which may be implemented on the controller 50 and a memory device 53. The memory device 53 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 51 to store, retrieve, and/or execute instructions and/or data.

The processor 51 executes various programs, and thereby controls other components of the controller 50 according to player instructions and data accepted by the user input device. The processor 51 executes a game program, and thereby conducts a game in accordance with the embodiments described herein. The memory device 53 stores programs and data used by the processor 51. Moreover, the memory device 53 stores data including, but not limited to, wagers, wager amounts, average wagers per game, a game type, awards, type of awards, triggering conditions, sound effects, game symbol display effects, 3D sound features, image data for producing game images and/or screens on the display device 33, 24, and temporarily stores variables, parameters, and the like that are used by the processor 51. In addition, the memory device 53 stores indicia, symbol weights, symbol values, paytables, and/or winning combination tables which represent relationships between combinations of random numbers and types of awards. In one embodiment, the memory device 53 utilizes RAM to temporarily store programs and data necessary for the progress of the game, and EPROM to store, in advance, programs and data for controlling basic operation of the gaming machine 10, such as the booting operation thereof.

The controller 50 obtains random numbers from the RNG, for example, at the start of each round of a game. The processor 51 uses the random numbers to determine an outcome of the games. For example, if the game is a video slot game, the processor 51 uses the RNG to randomly select an arrangement of symbols to be displayed on video reels. Moreover, the processor 51 generally uses random numbers generated by the RNG to play the games and to determine whether or not to provide an award and/or bonus features to a player. In one embodiment, the processor 51 may also use the random numbers to determine a stop position of each reel for use in stopping each of a plurality of mechanical reels and/or video reels being displayed in the display device 22, 24 to display the game outcome. The processor 51 may also obtain combinations of random numbers from the RNG and compare the generated combinations with winning combinations stored in the winning combination table to determine if the generated outcome is a winning outcome that is associated with a type of award. In general, the term "award" may be a payout, in terms of credits or money. Thus, the processor 51 may award a regular payout in response to the outcome of the game. However, it should be noted that the term award may also refer to other types of awards, including, prizes, e.g., meals, show tickets, etc . . . , as well as in-game award, such as bonus features, free games, and/or free spins, or awarding the player one or more wild symbols or stacked wild symbols in each of the games. In one embodiment, the RNG is configured by executing a random number generating program on the processor 51.

Further, in the embodiment when showing a free game provided as a bonus game, a bonus game that uses a different virtual reel strip 71 to 75 from a regular game may be provided. Further, there could be a provided a feature game according to a value of the random number acquired during a regular game.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Further, in the embodiment, a form providing a free game for a predetermined number of times as a bonus game is shown, and a bonus game that is not limited to a number of times may be provided. In this situation, there could be a configuration providing a bonus game until an end condition is satisfied, as an end condition is a combination of specified symbols, or a determining bonus game based on a random number.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

Figure 14:
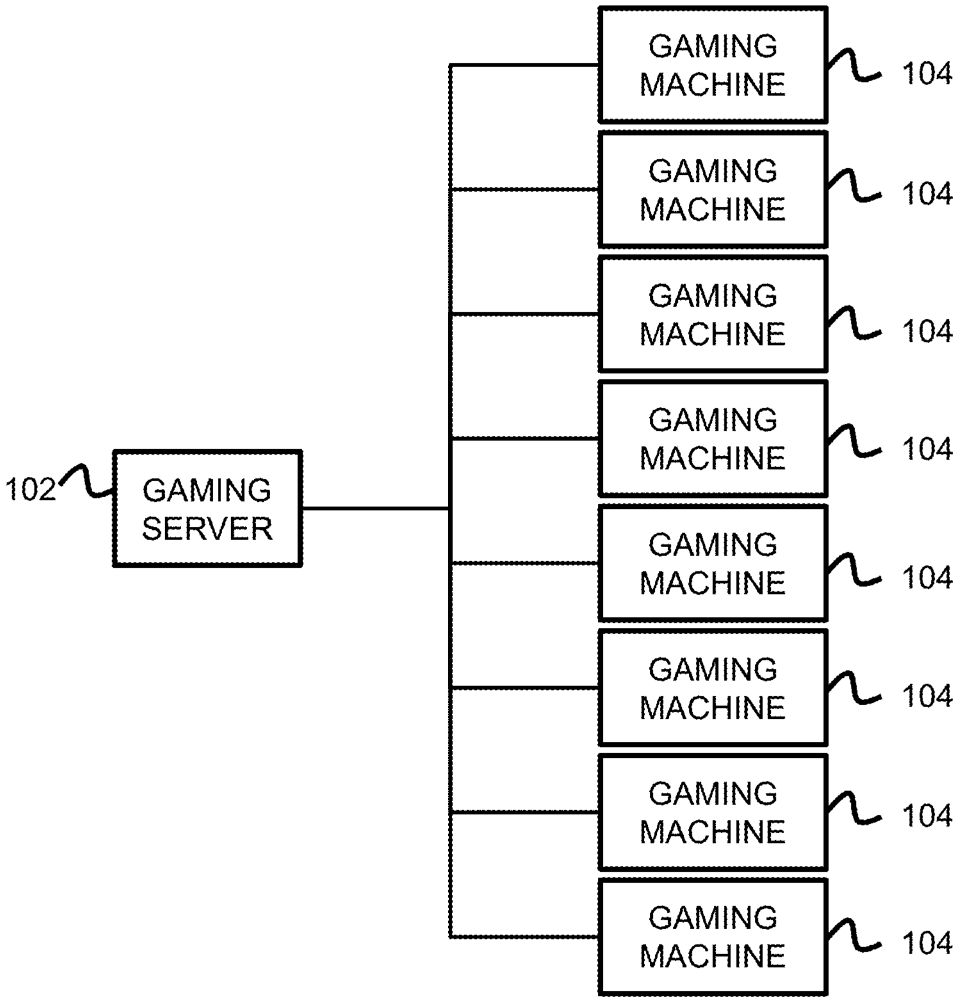
FIG. 14 is a block diagram of a system for providing a game to a plurality of gaming terminals.

In the embodiments discussed above, the primary game and the game feature are provided by the controller 50 on the gaming machine 10. The controller 50 includes one or more processors 51 on which a program is run to provide the primary game and the game feature. With reference to FIG. 14, in another embodiment of the present invention, the primary game and the game feature may be run, at least in part, on a remote gaming server. The gaming server 100 may provide the primary game and the game feature to one or more gaming terminals 104. In general, the gaming terminals 104 may have a similar structure and similar componentry as the gaming machine 10. Each gaming terminal 104 may have the same or similar components as shown in FIG. 2. The game server 102 may include one or more processors for running a program that provides the primary game and the game feature. The outcome of the primary game and the game feature may be communicated to each game terminal 104. If a player is playing at one or more of the gaming terminals 102, the gaming server 102 may run a separate/independent instance of the primary game/game feature that is associated with each gaming terminal 102. From the player's perspective, operation or play of the primary game and game feature via a gaming terminal 102 is the same or indistinguishable from play on a stand-alone gaming machine 10. The player may add funds to the gaming machine 10 or gaming terminal 100 using the bill-ticket identification unit 55 and initiate the primary game via the operation unit 36. However, the game is performed at the gaming server 102 and the outcome(s) generated at the gaming server 102 are communicated to the associated gaming terminal 102. There are several benefits to such a server-based system. First, the requirements of the hardware necessary to display the game and communicate player inputs to the gaming server 102 are less. Thus, the cost of the system overall may be less. Furthermore, since the program running the game resides at the gaming server, if changes or updates to the program are needed, the program only needs to be updated once.

Figure 15:
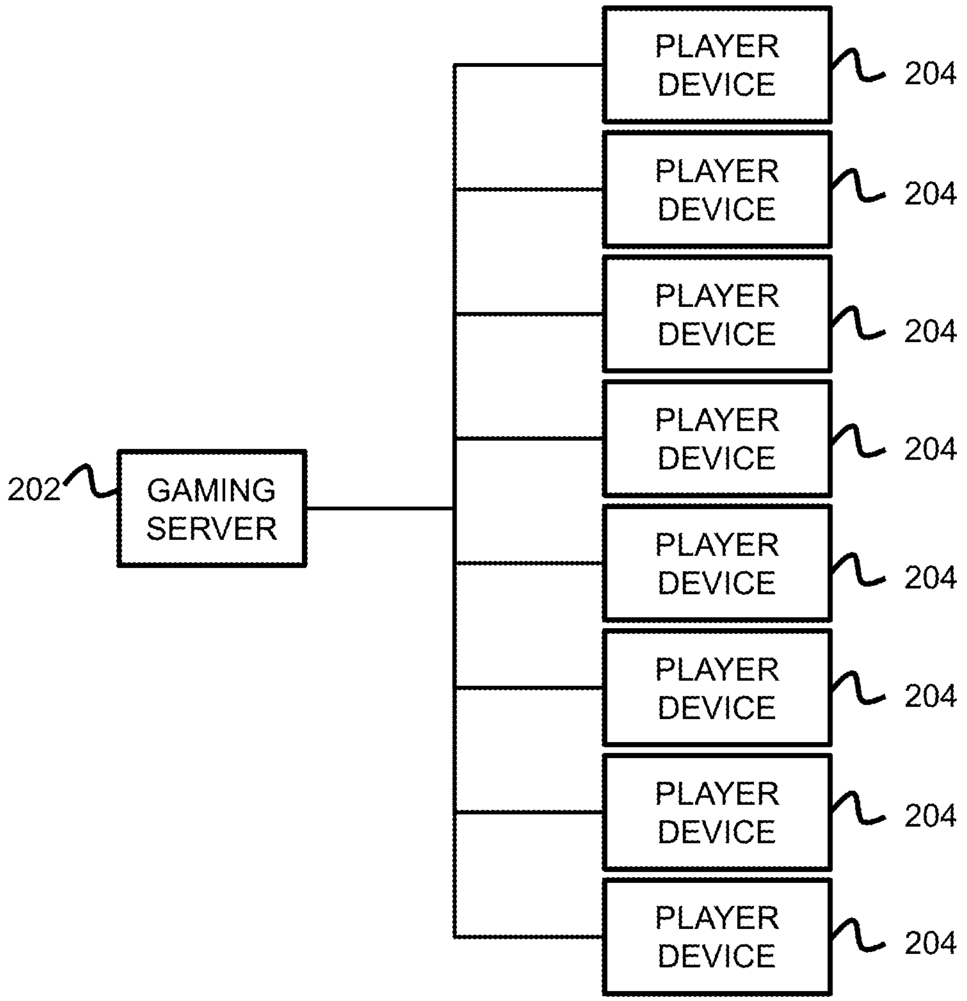
FIG. 15 is a block diagram of a system for providing a game to a plurality of player devices.

With reference to FIG. 15, the primary game and the game feature may also be provided via a gaming server 202 to a plurality of player devices 204. For example, the player devices 204 could be personal computer, tablet, mobile device or mobile phone. The primary game could be played via a computer program application or app running on the player device 204 or accessed via a website running on the world-wide web (WWW). In one embodiment, the primary game and/or game feature may be provided by the computer program application or app. The game server 202 is in communication with the player devices 204 to track game play, provide access to a player account (including funds used to make wagers), and to track wagers and wins (awards). In another embodiment, the primary game and game feature may be provided via the gaming server 202. In other words, the game server 202 may run an instance of a program application to provide the primary game/game feature for each (active) player device 204. The outcome(s) of the game are communicated to the player device 204, on which the outcome is displayed.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine for displaying a computer-animated reel game including a primary game and a game feature, comprising:

a gaming cabinet;

a display device mounted to the gaming cabinet and including graphical user interface (GUI) display screen displaying computer-generated images of the primary game and the game feature thereon; and a controller operably coupled to the display device, the controller including a memory device storing computer-executable instructions for displaying animated computer-generated images on the display device, a random number generator, and a processor programmed to execute the computer-executable instructions stored in the memory device to perform an algorithm to display an animated sequence of computer-generated images on the display device GUI including the steps of:

displaying a game screen on the display device GUI including a plurality of reels displayed in a grid having a plurality of cells arranged in a three row by five column (3×5) matrix, the plurality of reels including a first reel, a second reel, a third reel, a fourth reel, and a fifth reel within the grid displaying a plurality of game symbols including card symbols, picture symbols, and wild symbols, each reel being displayed within a corresponding column;

displaying four multiplier icons positioned above the grid including a first multiplier icon above the second reel, a third multiplier icon above the fourth reel, and a fourth multiplier icon above the fifth reel, each of the four multiplier icons displaying a different corresponding multiplier value;

establishing an outcome of the primary game using the random number generator and spin and stop the reels to display the outcome of the primary game;

establishing a primary game award as a function of the outcome of the primary game; and, upon detecting a first trigger condition including wild symbols appearing in the primary game outcome, responsively display the game feature on the display device GUI including:

(1) establish an initial number of free plays included in the game feature;

(2) establish a base feature award numerical value as a function of the primary game award;

(3) determine four feature trigger award numerical values available during the game feature, each feature trigger award numerical value being equal to a multiple of the base feature award numerical value and a corresponding multiplier icon;

(4) replace each multiplier icon with images of each feature trigger award numerical value along a top portion of the game screen prior to providing a free play and set each feature trigger award numerical value to a different occurrence of a re-trigger condition including two or more wild symbols being displayed within the grid with the reels stopped, each feature trigger award numerical value being displayed above a corresponding reel; and (5) provide the game feature to the player including the number of initial free plays;

the processor, in providing each free play, being further programmed to:

highlight an image of a current feature trigger award numerical value associated with a next occurrence of the re-triggering condition on the game screen prior to spinning the reels;

establish an outcome of the free play using the random number generator and spin and stop the reels to display the outcome of the free play; and upon detecting the next occurrence of the re-trigger condition, responsively:

(1) determine a number of additional free plays to be included in the game feature;

(2) determine the feature trigger award numerical value associated with the detected occurrence of the re-trigger condition; and (3) display a larger image of the determined feature trigger award numerical value and the determined number of additional free plays to the player.

2. The gaming machine of claim 1, wherein the processor is programmed to execute the algorithm including the steps of:

animating the first multiplier icon as "2×", the second multiplier icon as "4×", the third multiplier icon as "8×", and the fourth multiplier icon as "16×".

3. The gaming machine of claim 2, wherein the processor is programmed to execute the algorithm including the steps of:

animating a frame to appear around the image of the current feature trigger award numerical value.

4. The gaming machine of claim 3, wherein the processor is programmed to execute the algorithm including the steps of:

animating the frame to move to another adjacent feature trigger award numerical value image associated with another occurrence of re-triggering condition.

5. The gaming machine of claim 3, wherein the processor is programmed to execute the algorithm including the steps of:

displaying the base feature award numerical value as "2000"; and replacing the first multiplier icon of "2×" with a first retrigger numerical value icon of "4000";

replacing the second multiplier icon of "4×" with a second retrigger numerical value icon of "8000";

replacing the third multiplier icon of "8×" with a third retrigger numerical value icon of "16000"; and replacing the fourth multiplier icon of "16×" with a fourth retrigger numerical value icon of "32000".

6. A method of operating a gaming machine for displaying a computer-animated reel game including a primary game and a game feature, the gaming machine including a gaming cabinet, a display device mounted to the gaming cabinet and including graphical user interface (GUI) display screen displaying computer-generated images of the primary game and the game feature thereon, and a controller including a memory device storing computer-executable instructions for displaying animated computer-generated images on the display device, a random number generator, and a processor operably coupled to the display device, the method comprising the processor executing the computer-executable instructions stored in the memory device to perform an algorithm to display an animated sequence of computer-generated images on the display device GUI including the steps of:

displaying a game screen on the display device GUI including a plurality of reels displayed in a grid having a plurality of cells arranged in a three row by five column (3×5) matrix, the plurality of reels including a first reel, a second reel, a third reel, a fourth reel, and a fifth reel within the grid displaying a plurality of game symbols including card symbols, picture symbols, and wild symbols, each reel being displayed within a corresponding column;

displaying four multiplier icons positioned above the grid including a first multiplier icon above the second reel, a third multiplier icon above the fourth reel, and a fourth multiplier icon above the fifth reel, each of the four multiplier icons displaying a different corresponding multiplier value;

establishing an outcome of the primary game using the random number generator and spin and stop the reels to display the outcome of the primary game;

establishing a primary game award as a function of the outcome of the primary game; and, upon detecting a first trigger condition including wild symbols appearing in the primary game outcome, responsively display the game feature on the display device GUI including:

(1) establish an initial number of free plays included in the game feature;

(2) establish a base feature award numerical value as a function of the primary game award;

(3) determine four feature trigger award numerical values available during the game feature, each feature trigger award numerical value being equal to a multiple of the base feature award numerical value and a corresponding multiplier icon;

(4) replace each multiplier icon with images of each feature trigger award numerical value along a top portion of the game screen prior to providing a free play and set each feature trigger award numerical value to a different occurrence of a re-trigger condition including two or more wild symbols being displayed within the grid with the reels stopped, each feature trigger award numerical value being displayed above a corresponding reel; and (5) provide the game feature to the player including the number of initial free plays;

the processor, in providing each free play, being further programmed to:

highlight an image of a current feature trigger award numerical value associated with a next occurrence of the re-triggering condition on the game screen prior to spinning the reels;

establish an outcome of the free play using the random number generator and spin and stop the reels to display the outcome of the free play; and upon detecting the next occurrence of the re-trigger condition, responsively:

(1) determine a number of additional free plays to be included in the game feature;

(2) determine the feature trigger award numerical value associated with the detected occurrence of the re-trigger condition; and (3) display a larger image of the determined feature trigger award numerical value and the determined number of additional free plays to the player.

7. The method of claim 6, including the processor performing the algorithm including the steps of:

animating the first multiplier icon as "2×", the second multiplier icon as "4×", the third multiplier icon as "8×" and the fourth multiplier icon as "16×".

8. The method of claim 7, including the processor performing the algorithm including the steps of:

animating a frame to appear around the image of the current feature trigger award numerical value.

9. The method of claim 8, including the processor performing the algorithm including the steps of:

animating the frame to move to another adjacent feature trigger award numerical value image associated with another occurrence of the re-triggering condition.

10. The method of claim 8, including the processor performing the algorithm including the steps of:

displaying the base feature award numerical value as "2000"; and replacing the first multiplier icon of "2×" with a first retrigger numerical value icon of "4000";

replacing the second multiplier icon of "4×" with a second retrigger numerical value icon of "8000";

replacing the third multiplier icon of "8×" with a third retrigger numerical value icon of "16000"; and replacing the fourth multiplier icon of "16×" with a fourth retrigger numerical value icon of "32000".

11. A non-transitory computer-readable storage media having computer-executable instructions embodied thereon to operate a gaming machine for displaying a computer-animated reel game including a primary game and a game feature, the gaming machine including a display device including graphical user interface (GUI) display screen displaying computer-generated images of the primary game and the game feature thereon and a controller including a random number generator and a processor operably coupled to the display device, when executed by the processor the computer-executable instructions cause the processor to perform an algorithm to display an animated sequence of computer-generated images on the display device GUI including the steps of:

displaying a game screen on the display device GUI including a plurality of reels displayed in a grid having a plurality of cells arranged in a three row by five column (3×5) matrix, the plurality of reels including a first reel, a second reel, a third reel, a fourth reel, and a fifth reel within the grid displaying a plurality of game symbols including card symbols, picture symbols, and wild symbols, each reel being displayed within a corresponding column;

displaying four multiplier icons positioned above the grid including a first multiplier icon above the second reel, a third multiplier icon above the fourth reel, and a fourth multiplier icon above the fifth reel, each of the four multiplier icons displaying a different corresponding multiplier value;

establishing an outcome of the primary game using the random number generator and spin and stop the reels to display the outcome of the primary game;

establishing a primary game award as a function of the outcome of the primary game; and, upon detecting a first trigger condition including wild symbols appearing in the primary game outcome, responsively display the game feature on the display device GUI including:

(1) establish an initial number of free plays included in the game feature;

(2) establish a base feature award numerical value as a function of the primary game award;

(3) determine four feature trigger award numerical values available during the game feature, each feature trigger award numerical value being equal to a multiple of the base feature award numerical value and a corresponding multiplier icon;

(4) replace each multiplier icon with images of each feature trigger award numerical value along a top portion of the game screen prior to providing a free play and set each feature trigger award numerical value to a different occurrence of a re-trigger condition including two or more wild symbols being displayed within the grid with the reels stopped, each feature trigger award numerical value being displayed above a corresponding reel; and (5) provide the game feature to the player including the number of initial free plays;

the processor, in providing each free play, being further programmed to:

highlight an image of a current feature trigger award numerical value associated with a next occurrence of the re-triggering condition on the game screen prior to spinning the reels;

establish an outcome of the free play using the random number generator and spin and stop the reels to display the outcome of the free play; and upon detecting the next occurrence of the re-trigger condition, responsively:

(1) determine a number of additional free plays to be included in the game feature;

(2) determine the feature trigger award numerical value associated with the detected occurrence of the re-trigger condition; and (3) display a larger image of the determined feature trigger award numerical value and the determined number of additional free plays to the player.

12. The non-transitory computer-readable storage media of claim 11, wherein the computer-executable instructions cause the processor to perform the algorithm including the steps of:

animating the first multiplier icon as “2×”, the second multiplier icon as “4×”, the third multiplier icon as “8×” and the fourth multiplier icon as “16×”.

13. The non-transitory computer-readable storage media of claim 12, wherein the computer-executable instructions cause the processor to perform the algorithm including the steps of:

animating a frame to appear around the image of the current feature trigger award numerical value.

14. The non-transitory computer-readable storage media of claim 13, wherein the computer-executable instructions cause the processor to perform the algorithm including the steps of:

animating the frame to move to another adjacent feature trigger award numerical value image associated with another occurrence of the re-triggering condition.

* * * * *